(12) United States Patent
Iwamura et al.

(10) Patent No.: US 11,431,970 B2
(45) Date of Patent: Aug. 30, 2022

(54) INTRA PREDICTION DEVICE, IMAGE DECODING DEVICE AND PROGRAM

(71) Applicant: NIPPON HOSO KYOKAI, Tokyo (JP)

(72) Inventors: Shunsuke Iwamura, Tokyo (JP); Atsuro Ichigaya, Tokyo (JP); Shimpei Nemoto, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 0 days.

(21) Appl. No.: 17/645,916

(22) Filed: Dec. 23, 2021

(65) Prior Publication Data

US 2022/0124324 A1 Apr. 21, 2022

Related U.S. Application Data

(63) Continuation of application No. PCT/JP2020/024675, filed on Jun. 23, 2020.

(30) Foreign Application Priority Data

Jun. 25, 2019 (JP) .............................. JP2019-117928

(51) Int. Cl.
*H04N 19/176* (2014.01)
*H04N 19/186* (2014.01)
(Continued)

(52) U.S. Cl.
CPC ........... *H04N 19/11* (2014.11); *H04N 19/159* (2014.11); *H04N 19/176* (2014.11); *H04N 19/186* (2014.11)

(58) Field of Classification Search
CPC . H04N 19/159; H04N 19/1176; H04N 19/186
See application file for complete search history.

(56) References Cited

U.S. PATENT DOCUMENTS 10,897,617 B2 *  1/2021  Huang ................. H04N 19/176
10,999,596 B2 *  5/2021  Huang ................. H04N 19/521
(Continued)

FOREIGN PATENT DOCUMENTS

WO    2014/156046 A1    10/2014
WO    2014/161043 A1    10/2014
WO    2018/127624 A1     7/2018

OTHER PUBLICATIONS

Benjamin Bross et al. "Versatile Video Coding (Draft 4)" Joint Video Experts Team (JVET) of ITU-T SG 16 WP 3 and ISO/IEC JTC 1/SC 29/WG 11, Jan. 9-18, 2019, pp. 1-267, 13th Meeting: Marrakech, MA, JVET-M1001-v4.
(Continued)

*Primary Examiner* — Tsion B Owens
(74) *Attorney, Agent, or Firm* — Studebaker & Brackett PC

(57) ABSTRACT

An intra prediction device performing intra prediction on a luminance block and a chrominance block includes: a chrominance candidate specifier configured to specify a mode number of an intra prediction mode applied to the luminance block corresponding to the chrominance block as one of candidates for an intra prediction mode to be applied to the chrominance block; and a chrominance prediction mode converter configured to convert the mode number before conversion specified by the chrominance candidate specifier using a conversion table and output a mode number after conversion. In the conversion table, for directional prediction, a given number of mode numbers in ascending order of the mode number among the mode numbers before conversion are associated with a given number of mode numbers in descending order of the mode number among the mode numbers after conversion.

5 Claims, 12 Drawing Sheets

(51) Int. Cl.
*H04N 19/11* (2014.01)
*H04N 19/159* (2014.01)

(56) References Cited

U.S. PATENT DOCUMENTS

| | | | |
|---|---|---|---|
| 11,019,332 B2 * | 5/2021 | Wang | H04N 19/186 |
| 11,172,200 B2 * | 11/2021 | Karczewicz | H04N 19/18 |
| 11,297,309 B2 * | 4/2022 | Kim | H04N 19/593 |
| 2016/0050422 A1 | 2/2016 | Rosewarne et al. | |
| 2016/0080773 A1 | 3/2016 | Nakamura et al. | |
| 2019/0356909 A1 | 11/2019 | Lainema | |
| 2022/0109860 A1 * | 4/2022 | Chen | H04N 19/117 |

OTHER PUBLICATIONS

Fabien Racapé et al. "CE3-Related: Wide-Angle Intra Prediction for Non-Square Blocks" Joint Video Experts Team (JVET) of ITU-T SG 16 WP 3 and ISO/IEC JTC 1/SC 29/WG 11, Jul. 10-18, 2018, pp. 1-14, 11th Meeting: Ljubljana, Slovenia, JVET-K0500_r4.
Shunsuke Iwamura et al. "Non-CE3: On Chroma DM Derivation Table for 4:2:2 Chroma Format" Joint Video Experts Team (JVET) of ITU-T SG 16 WP 3 and ISO/IEC JTC 1/SC 29/WG 11, Jul. 3-12, 2019, pp. 1-5, 15th Meeting: Gothenburg, Sweden, JVET-O0655.
International Search Report issued in PCT/JP2020/024675; dated Sep. 15, 2020.
Written Opinion of the International Searching Authority issued in PCT/JP2020/024675; dated Sep. 15, 2020.

* cited by examiner

CASE WHERE W:H OF Y IS 4:1

CASE WHERE W.H OF Y IS 8:1

CASE WHERE W:H OF Y IS 1:4

CASE WHERE W:H OF Y IS 1:8

INTRA PREDICTION DEVICE, IMAGE DECODING DEVICE AND PROGRAM

RELATED APPLICATIONS

The present application is a continuation based on PCT Application No. PCT/JP2020/024675, filed on Jun. 23, 2020, which claims the benefit of Japanese Patent Application No. 2019-117928 filed on Jun. 25, 2019. The content of which is incorporated by reference herein in their entirety.

TECHNICAL FIELD

The present disclosure relates to an intra prediction device, an image decoding device and a program.

BACKGROUND ART

In a video encoding scheme for compressing a data amount upon transmission and upon storage of a still image and a moving image, intra prediction is utilized in which decoded reference pixels around an encoding target block are referred to by utilizing spatial correlation within a frame. Intra prediction modes include, for example, Planar prediction, DC prediction and directional prediction.

In HEVC (Hight Efficiency Video Coding) that is one of video encoding schemes in related art, an image is divided into square encoding target blocks, and encoding and decoding are performed in block unit.

In directional prediction of HEVC, a plurality of prediction directions is defined from −135° to 45° assuming that a clockwise direction is a positive direction, and a counterclockwise direction is a negative direction with respect to a vertical direction, and mode numbers are allocated in ascending order for each prediction direction from −135° to +45°.

In HEVC, upon intra prediction of a chrominance block, an intra prediction mode to be used for intra prediction of the chrominance block is determined from a plurality of candidate modes including a DM (Derived Mode) that is an intra prediction mode used for intra prediction of a luminance block corresponding to this chrominance block.

Further, in HEVC, a chrominance format of 4:2:2 can be applied, and this chrominance format makes horizontal direction resolution of the chrominance signal half of horizontal direction resolution of a luminance signal, and thus, while a luminance block has a square shape, a chrominance block has a vertically long block shape.

Thus, in a case where the chrominance format of 4:2:2 is applied, DM conversion processing that converts the DM in line with a shape of the chrominance block is applied. Specifically, as illustrated in Table 1, the DM is converted using a conversion table in which mode numbers (modeIdx) before conversion are associated with mode numbers (IntraPredModeC) after conversion. Note that in HEVC, mode numbers "2" to "34" indicate directional prediction.

Meanwhile, in VVC (Versatile Video Coding) that is a next generation video coding scheme, 65 types of directional prediction from mode numbers "2" to "66" are introduced as directional prediction, which achieves more detailed intra prediction (see, for example, Non Patent Literature 1).

Further, in VVC, a non-square block shape can also be applied as well as a square block shape like HEVC, and wide-angle intra prediction (WAIP) that is an intra prediction mode in line with a non-square block shape is introduced. Selection of a mode that is to be applied from intra prediction modes in accordance with the block shape enables more flexible intra prediction.

In WAIP, in a case of a non-square block shape, processing of deleting part of prediction modes in a case of a square block shape (on a side of smaller mode numbers in a case of a horizontally long block, and on a side of greater mode numbers in a case of a vertically long block) and adding prediction modes corresponding to the number of the deleted prediction modes on an opposite side (on a side of greater mode numbers in a case of a horizontally long block, and on a side of smaller mode numbers in a case of a vertically long block) is performed.

CITATION LIST

Non Patent Literature

Non Patent Literature 1
JVET-M1001 Versatile Video Coding (Draft 4)

DISCLOSURE OF INVENTION

An intra prediction device according to a first feature performs intra prediction on a luminance block and a chrominance block obtained by dividing an image formed from a luminance signal and a chrominance signal. The intra prediction device includes: a chrominance candidate specifier configured to specify a mode number of an intra prediction mode applied to the luminance block corresponding to the chrominance block as one of candidates for an intra prediction mode to be applied to the chrominance block; and a chrominance prediction mode converter configured to convert the mode number before conversion specified by the chrominance candidate specifier using a conversion table and output a mode number after conversion, in a case where a chrominance format in which horizontal direction resolution of the chrominance signal is lower than horizontal direction resolution of the luminance signal, and vertical direction resolution of the chrominance signal is equal to vertical direction resolution of the luminance signal is applied. In the conversion table, a given number of mode numbers in ascending order of the mode number among the mode numbers before conversion are associated with a given number of mode numbers in descending order of the mode number among the mode numbers after conversion, for directional prediction.

An image decoding device according to a second feature includes the intra prediction device according to the first feature.

A program according to a third feature causes a computer to function as the intra prediction device according to the first feature.

TABLE 1

| modeIdx | X <= 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|
| IntraPredModeC | X | 2 | 2 | 2 | 3 | 5 | 7 | 8 | 10 | 12 | 13 | 15 | 17 | 18 | 19 | 20 |
| modeIdx | 18 | 19 | 20 | 21 | 22 | 23 | 24 | 25 | 26 | 27 | 28 | 29 | 30 | 31 | 32 | 33 | 34 |
| IntraPredModeC | 21 | 22 | 23 | 23 | 24 | 24 | 25 | 25 | 26 | 27 | 27 | 28 | 28 | 29 | 29 | 30 | 31 |

DESCRIPTION OF EMBODIMENTS

In the conversion table to be used for DM conversion processing in related art illustrated in Table 1, wide-angle intra prediction modes of WAIP, that is, prediction directions that deviate from an angle range from −135° to +45° are note taken into account. In a case where such a conversion table is used, the mode cannot be converted into an intra prediction mode of a prediction direction at an angle greater than −135° that is the mode number "2" in a counterclockwise direction.

Thus, there is a case where the DM cannot be converted in line with a shape of the chrominance block in the DM conversion processing in related art, which leaves room for improvement in prediction efficiency of the chrominance block.

The present disclosure is therefore directed to improving prediction efficiency of a chrominance block.

An image encoding device and an image decoding device according to a present embodiment of the invention are described with reference to the accompanying drawings. The image encoding device and the image decoding device according to the present embodiment encode and decode videos such as MPEG videos. In the description of the drawings below, the same or similar reference signs are used for the same or similar parts.

<Image Encoding Device>

Figure 1:
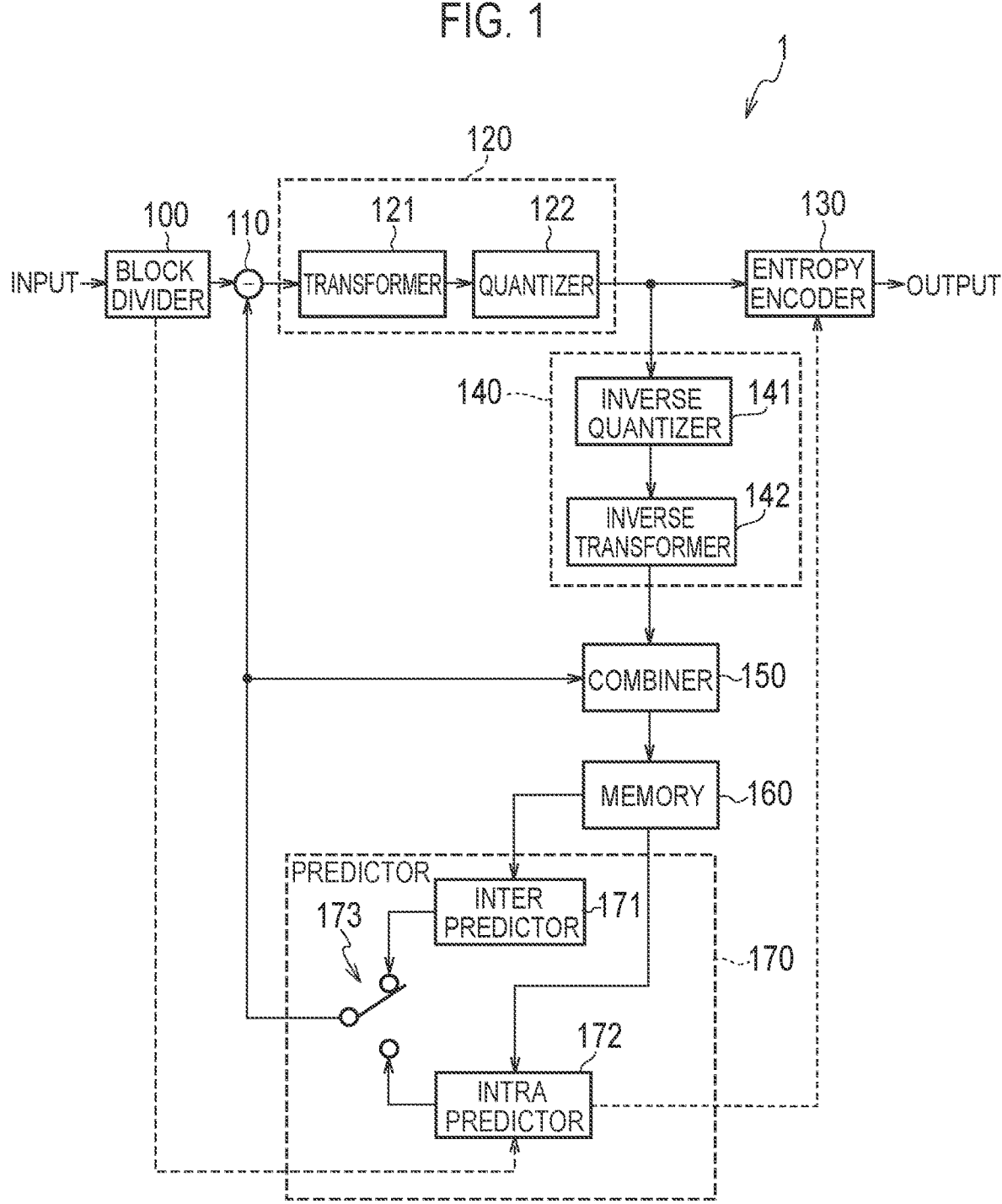
FIG. 1 is a diagram illustrating a configuration of an image encoding device according to an embodiment.

First, the image encoding device according to the present embodiment is described. FIG. 1 is a diagram illustrating a configuration of the image encoding device 1 according to the present embodiment.

As illustrated in FIG. 1, the image encoding device 1 includes a block divider 100, a subtractor 110, a transformer/quantizer 120, an entropy encoder 130, an inverse quantizer/inverse transformer 140, a combiner 150, a memory 160, and a predictor 170.

The block divider 100 divides an original image that is an input image in of a frame (or picture) that constitutes a moving image into a plurality of image blocks and outputs the image blocks obtained through division to the subtractor 110. A size of the image block is, for example, 32×32 pixels, 16×16 pixels, 8×8 pixels, 4×4 pixels, or the like. A shape of the image block is not limited to a square and may be non-square. The image block is a unit (encoding target block) in which the image encoding device 1 performs encoding and is a unit (decoding target block) in which an image decoding device performs decoding. Such an image block is sometimes referred to as a CU (Coding Unit).

The input image is formed from a luminance signal (Y) and a chrominance signal (Cb, Cr) and each pixel within the input image is formed from a luminance component (Y) and a chrominance component (Cb, Cr). The image encoding device 1 supports three chrominance formats (Chroma format) of 4:4:4, 4:2:2 and 4:2:0.

The block divider 100 divides a block for the luminance signal and the chrominance signal. While a case will be mainly described below where a shape of block division is the same between the luminance signal and the chrominance signal, division can be independently controlled for the luminance signal and the chrominance signal. The image encoding device 1 can separately encode a luminance block and a chrominance block. In a case where the luminance block and the chrominance block are not particularly distinguished from each other, they are simply called encoding target blocks.

The subtractor 110 calculates prediction residuals that represent differences (errors) between an encoding-target block outputted from the block divider 100 and a prediction block obtained by the predictor 170 predicting the encoding-target block. Specifically, the subtractor 110 calculates a prediction residual by subtracting each pixel value in the prediction block from each pixel value in the block, and outputs the calculated prediction residuals to the transformer/quantizer 120.

The transformer/quantizer 120 executes an orthogonal transform process and a quantization process on each of blocks. The transformer/quantizer 120 includes a transformer 121 and a quantizer 122.

The transformer 121 calculates orthogonal transform coefficients by performing the orthogonal transform process on the prediction residuals outputted from the subtractor 110, and outputs the calculated orthogonal transform coefficients to the quantizer 122. Orthogonal transform is, for example, discrete cosine transform (DCT), discrete sine transform (DST), Karhunen Loeve transform (KLT), or the like.

The quantizer 122 quantizes the orthogonal transform coefficient output from the transformer 121 using a quantization parameter (Qp) and a quantization matrix and outputs the quantized orthogonal transform coefficient to the entropy encoder 130 and the inverse quantizer/inverse transformer 140. Note that the quantization parameter (Qp) is a parameter to be applied in common to respective orthogonal transform coefficients within a block and is a parameter that determines quantization granularity. The quantization matrix is a matrix having quantization values for quantizing the respective orthogonal transform coefficients, as elements.

The entropy encoder 130 performs entropy encoding on the orthogonal transform coefficient output from the quantizer 122, performs data compression to generate encoded data (bit streams) and outputs the encoded data to outside of the image encoding device 1. Huffman coding, CABAC (Context-based Adaptive Binary Arithmetic Coding), or the like, can be used as entropy encoding. Note that the entropy encoder 130 acquires information of shapes (aspect ratios) of respective blocks from the block divider 100, acquires information of an index, or the like, regarding prediction from the predictor 170 and performs entropy encoding on these kinds of information.

The inverse quantizer/inverse transformer 140 executes an inverse quantization process and an inverse orthogonal transform process on each of blocks. The inverse quantizer/inverse transformer 140 includes an inverse quantizer 141 and an inverse transformer 142.

The inverse quantizer 141 performs the inverse quantization process corresponding to the quantization process performed by the quantizer 122. More specifically, the inverse quantizer 141 inverse quantizes the orthogonal transform coefficients outputted from the quantizer 122 by using the quantization parameter (Qp) and the quantization matrix to restore the orthogonal transform coefficients, and outputs the restored orthogonal transform coefficients to the inverse transformer 142.

The inverse transformer 142 performs the inverse orthogonal transform process corresponding to the orthogonal transform process performed by the transformer 121. For example, when the transformer 121 performs discrete cosine transform, the inverse transformer 142 performs inverse discrete cosine transform. The inverse transformer 142 restores the prediction residuals by performing the inverse orthogonal transform process on the orthogonal transform coefficients outputted from the inverse quantizer 141, and outputs restoration prediction residuals that are the restored prediction residuals to the combiner 150.

The combiner 150 combines a restored prediction residual outputted by the inverse transformer 142 and a predicted block outputted by the predictor 170 pixel by pixel. The combiner 150 reconstructs (decodes) the block by adding each pixel value of the restored prediction residual to the corresponding pixel value of the predicted block, and outputs the decoded image on each of decoded blocks to the memory 160. A decoded image may be referred to as a reconstructed image.

The memory 160 stores the decoded image outputted from the combiner 150. The memory 160 stores decoded images in units of frames. The memory 160 outputs decoded images to the predictor 170. Note that a loop filter may be provided between the combiner 150 and the memory 160.

The predictor 170 performs prediction in block unit. The predictor 170 includes a inter predictor 171, an intra predictor 172, and a switch 173.

The inter predictor 171 calculates a motion vector through a scheme such as block matching using a decoded image stored in the memory 160 as a reference image, predicts an encoding target block to generate an inter prediction block and outputs the generated inter prediction block to the switch 173.

The inter predictor 171 selects an optimal inter prediction method among inter prediction (typically, bi-prediction) using a plurality of reference images and inter prediction (single direction prediction) using one reference image and performs inter prediction using the selected inter prediction method. The inter predictor 171 outputs information (such as a motion vector) regarding inter prediction to the entropy encoder 130.

The intra predictor 172 generates an intra prediction block with reference to decoded pixel values around the encoding target block among the decoded image stored in the memory 160 and outputs the generated intra prediction block to the switch 173. Further, the intra predictor 172 outputs an index regarding the selected intra prediction mode to the entropy encoder 130.

The switch 173 switches the prediction block between the inter prediction block input from the inter predictor 171 and the intra prediction block input from the intra predictor 172 and outputs one of the prediction blocks to the subtractor 110 and the combiner 150.

The intra predictor 172 selects an optimal intra prediction mode to be applied to an intra prediction target block from a plurality of intra prediction modes and predicts an intra prediction target block using the selected intra prediction mode.

Specifically, the intra predictor 172 performs intra prediction on a luminance block and outputs a luminance intra prediction block. Further, the intra predictor 172 performs intra prediction on a chrominance block and outputs a chrominance intra prediction block.

The intra predictor 172 performs intra prediction on the luminance block corresponding to a chrominance block before performing intra prediction on the chrominance block. Then, the intra predictor 172 causes the intra prediction mode used for intra prediction of respective luminance blocks to be stored in the memory 160.

The luminance block corresponding to the chrominance block refers to a luminance block located at a position corresponding to a position of the chrominance block in which resolution conversion of the chrominance signal is taken into account. However, in a case where a plurality of luminance blocks exist at positions corresponding to the position of the chrominance block, the chrominance block is divided into two in a vertical direction, divided into two in a horizontal direction and sets a luminance block including a luminance pixel corresponding to a chrominance pixel located at a top left corner in the lower right divided block among four divided blocks obtained as a result, as the luminance block corresponding to the chrominance block.

Figure 2:
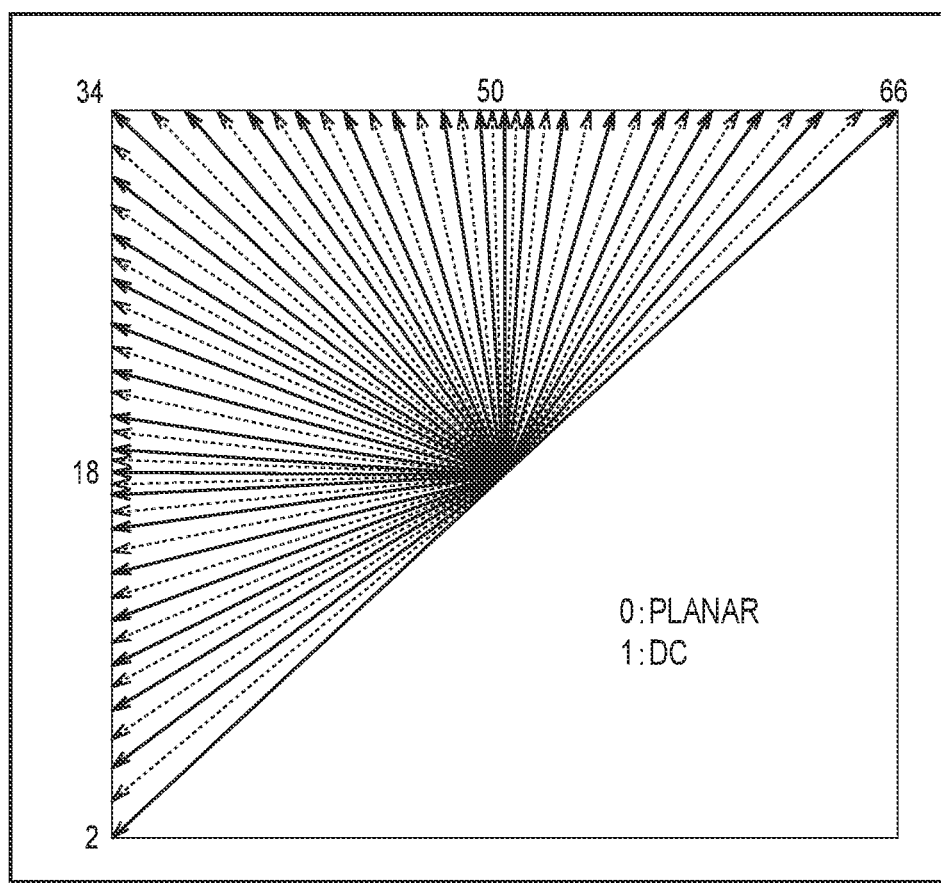
FIG. 2 is a diagram illustrating candidates of an intra prediction mode to be used for a luminance block according to the embodiment.

FIG. 2 is a diagram illustrating candidates for an intra prediction mode to be used as the luminance block according to the present embodiment.

As illustrated in FIG. 2, there are 67 types of intra prediction modes from 0 to 66. A mode number "0" of the intra prediction mode is Planar prediction, a mode number "1" of the intra prediction mode is DC prediction, and mode numbers from "2" to "66" of the intra prediction mode are directional prediction.

In the directional prediction, a direction of an arrow indicates a prediction direction that is a direction in which a reference pixel is referred to upon intra prediction, a point of origin of an arrow indicates a position of a pixel to be predicted, and an end point of an arrow indicates a position of a reference pixel to be used for prediction of the pixel to be predicted.

For prediction directions parallel to a diagonal line that passes through an upper right vertex and a lower left vertex of a block, a mode number "2" that is an intra prediction mode in which a lower left direction is referred to, and a mode number "66" that is an intra prediction mode in which an upper right direction is referred to are given, and mode numbers are allocated clockwise for each predetermined angle from the mode number "2" to the mode number "66".

The prediction direction in the mode number "2" in which the lower left direction is referred to forms 45° with a horizontal direction. The prediction direction in the mode number "66" forms 45° with a vertical direction. Note that in a case where a clockwise direction is set as a positive direction and a counterclockwise direction is set as a negative direction with respect to the vertical direction, the prediction direction in the mode number "2" is −135°, and the prediction direction in the mode number "66" is 45°.

The encoding target block output by the block divider 100 can take a non-square block shape in addition to a square block shape. In a case where the encoding target block has a non-square block shape, the intra predictor 172 adjusts a range of a prediction direction of the intra prediction mode to be used for the encoding target block. Such a techniques is referred to as Wide Angle Intra Prediction (WAIP).

Figure 3:
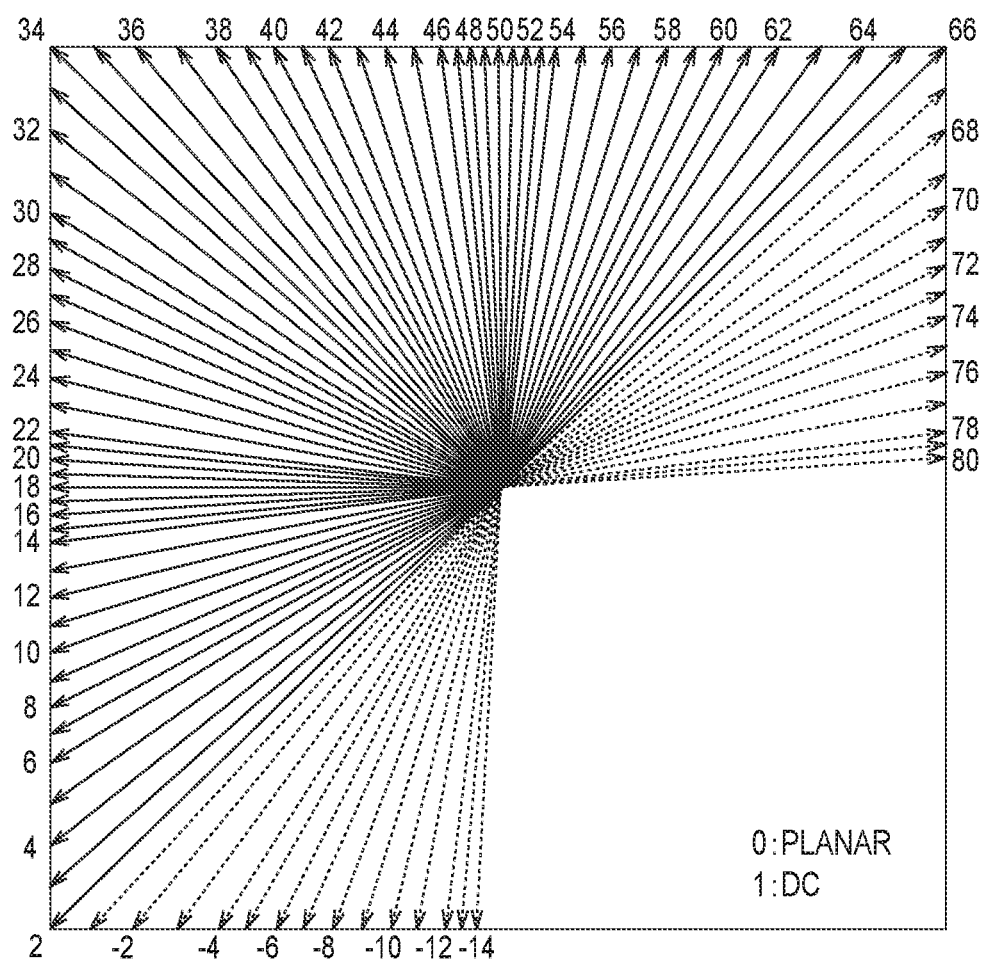
FIG. 3 is a diagram illustrating WAIP according to the embodiment.

FIG. 3 is a diagram illustrating WAIP according to the present embodiment.

As illustrated in FIG. 3, in WAIP, in a case where the luminance block has a horizontally long block shape (that is, a shape having a width longer than a height), the intra predictor 172 deletes part of intra prediction modes in ascending order of the mode number and adds the deleted intra prediction modes to a side of a greater mode number.

Meanwhile, in a case where the luminance block has a vertically long block shape (that is, a shape having a width shorter than a height), the intra predictor 172 deletes part of intra prediction modes in descending order of the mode number and adds the deleted intra prediction modes to a side of a smaller mode number.

Through such processing of WAIP, prediction directions are determined so that an outermost intra prediction mode among the added intra prediction modes is parallel to a diagonal line of a non-square block. Selection of a mode that is to be applied from the intra prediction modes in line with the prediction block shape enables more flexible intra prediction.

Figure 4A:
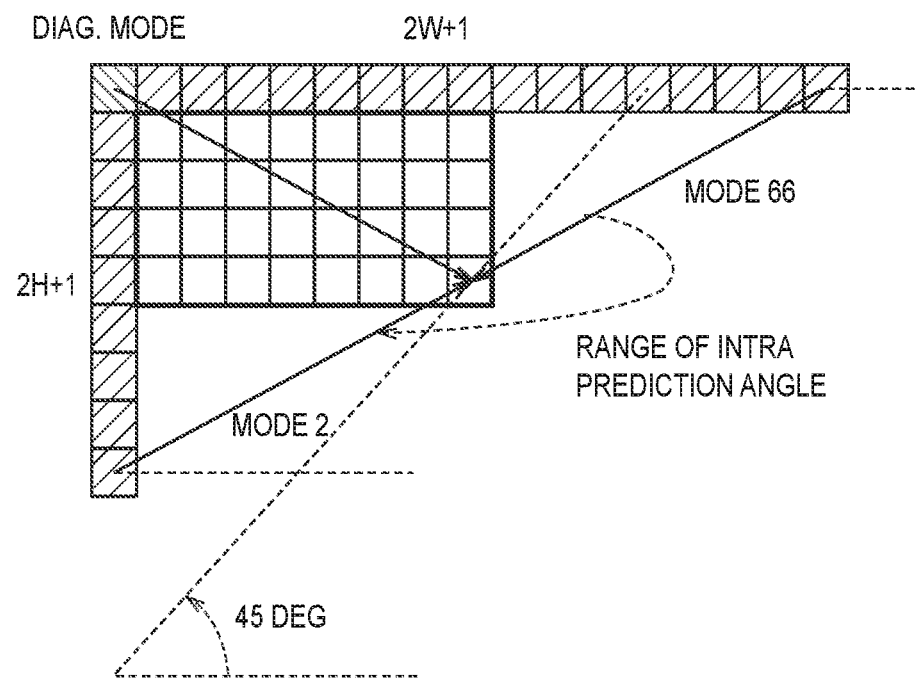
FIG. 4A is a diagram illustrating an example of a range of intra prediction angle from mode numbers "2" to "66" in a case where a luminance block has a horizontally long block shape.
Figure 4B:
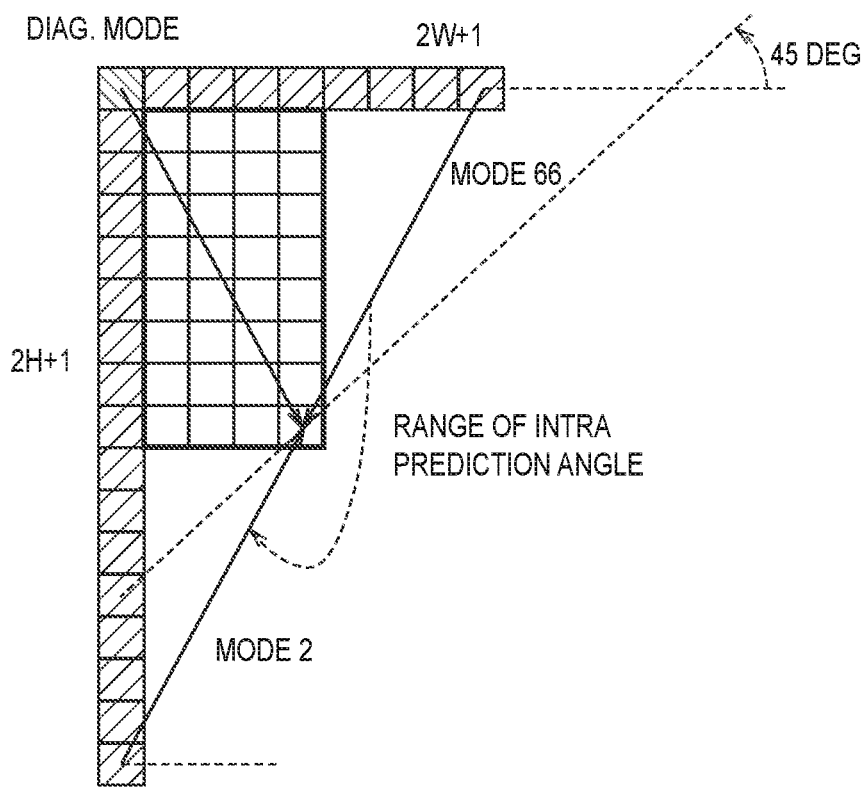
FIG. 4B is a diagram illustrating an example of a range of intra prediction angle from mode numbers "2" to "66" in a case where the luminance block has a vertically long block shape.

FIG. 4A is a diagram illustrating an example of a range of intra prediction angle from the mode numbers "2" to "66" in a case where the luminance block has a horizontally long block shape. FIG. 4B is a diagram illustrating an example of a range of intra prediction angle from the mode numbers "2" to "66" in a case where the luminance block has a vertically long block shape. In FIG. 4A and FIG. 4B, open squares illustrate pixels of a prediction target block, and shaded squares illustrate reference pixels. As illustrated in FIG. 4A and FIG. 4B, in a case where the luminance block has a non-square block shape, prediction directions of the mode numbers "2" and "66" become angles different from 45°.

The intra predictor 172 selects an intra prediction mode to be used for intra prediction of the luminance block from these intra prediction modes, performs intra prediction of the luminance block using the selected intra prediction mode and outputs a luminance intra prediction block. Further, the intra predictor 172 outputs an index indicating the intra prediction mode selected from these candidates (hereinafter, referred to as a "luminance intra prediction mode index") to the entropy encoder 130, and the entropy encoder 130 encodes and outputs this index.

In this manner, concerning the non-square block, some directional intra prediction modes in related art are adaptively replaced with wide-angle intra prediction modes. The image decoding device 2 side is notified of the replaced intra prediction modes with luminance intra prediction mode indexes that indicate the original mode numbers. The image decoding device 2 side analyzes the luminance intra prediction mode indexes and replaces the mode numbers with mode numbers of wide-angle modes. Thus, the total number of intra prediction modes remains 67.

Meanwhile, the number of candidates for the intra prediction mode of the chrominance block is smaller than the number of candidates for the intra prediction mode of the luminance block.

The number of candidates for the intra prediction mode that are common between the chrominance block and the luminance block is four of a Planar mode (mode number "0"), a DC mode (mode number "1"), a vertical prediction mode (mode number "50") and a horizontal prediction mode (mode number "18"), and becomes 5 by the DM being added. Four of the Planar mode (mode number "0"), the DC mode (mode number "1"), the vertical prediction mode (mode number "50") and the horizontal prediction mode (mode number "18") are sometimes referred to as "default modes".

The DM is an intra prediction mode used for intra prediction of the luminance block corresponding to the chrominance block. Note that the intra prediction mode specific to the chrominance block includes inter color component prediction in which decoded pixels of the luminance block are used in prediction. While a case will be described below where a function of inter color component prediction is disabled, the function of inter color component prediction may be enabled.

The intra predictor 172 selects an intra prediction mode to be used for intra prediction of the chrominance block from these chrominance intra prediction candidates, performs intra prediction of the chrominance block using the selected intra prediction mode and outputs a chrominance intra prediction block. Further, the intra predictor 172 outputs an index that indicates the intra prediction mode selected from these candidates (hereinafter, referred to as a "chrominance intra prediction mode index") to the entropy encoder 130, and the entropy encoder 130 encodes and outputs this index.

As illustrated in Table 2, the chrominance intra prediction mode index is an index indicating one of five intra prediction mode candidates.

TABLE 2

| Chrominance intra prediction mode index | Intra prediction mode number applied to luminance | | | | |
|---|---|---|---|---|---|
| | 0 | 50 | 18 | 1 | X (2 ≤ X ≤ 66, except X = 50 and X = 18) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

In a case where the intra prediction mode applied to the luminance block corresponding to the chrominance block overlaps with the default mode, the mode number "66" is added as an alternative mode. On the other hand, in a case where the intra prediction mode applied to the luminance block corresponding to the chrominance block does not overlap with the default mode, a mode number "X" of the intra prediction mode applied to the luminance block is added as the DM.

<Image Decoding Device>

Figure 5:
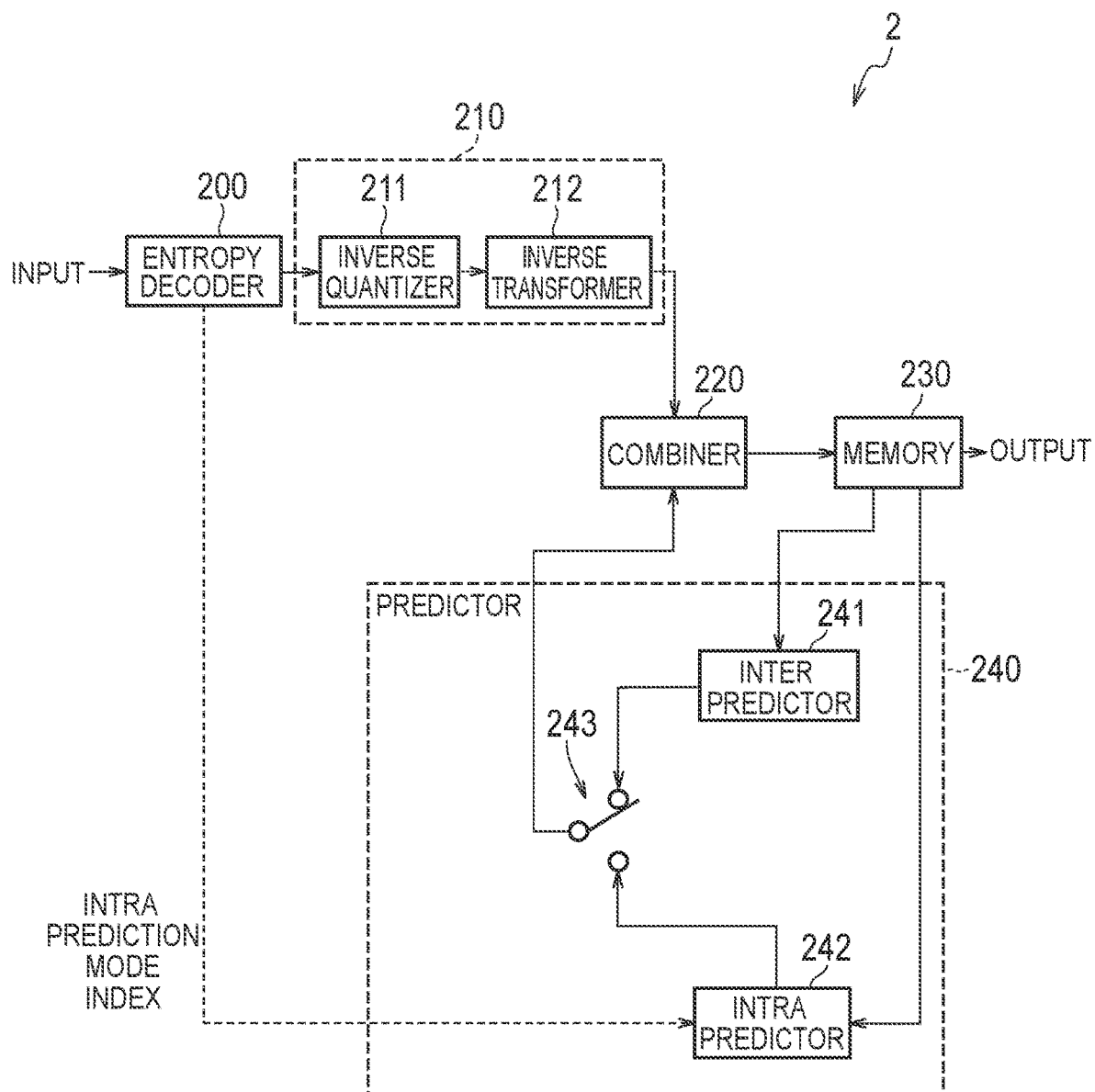
FIG. 5 is a diagram illustrating a configuration of an image decoding device according to the embodiment.

Next, the image decoding device according to the present embodiment is described. FIG. 5 is a diagram illustrating a configuration of the image decoding device 2 according to the present embodiment.

As illustrated in FIG. 5, the image decoding device 2 includes an entropy decoder 200, an inverse quantizer/inverse transformer 210, a combiner 220, a memory 230, and a predictor 240.

The entropy decoder 200 decodes the encoded data generated by the image encoding device 1 and outputs the quantized orthogonal transform coefficient to the inverse quantizer/inverse transformer 210. Further, the entropy decoder 200 acquires an index regarding prediction (intra prediction and inter prediction) and outputs the acquired index to the predictor 240. Here, the entropy decoder 200 outputs the luminance intra prediction mode index and the chrominance intra prediction mode index to the predictor 240. Further, the entropy decoder 200 acquires information such as shapes (aspect ratios) of the respective blocks and outputs the acquired information to the predictor 240.

The inverse quantizer/inverse transformer 210 that executes an inverse quantization process and an inverse orthogonal transform process on each of blocks. The inverse quantizer/inverse transformer 210 includes an inverse quantizer 211 and an inverse transformer 212.

The inverse quantizer 211 performs inverse quantization processing corresponding to quantization processing performed by the quantizer 122 of the image encoding device 1. The inverse quantizer 211 inversely quantizes the quantized orthogonal transform coefficient output from the entropy decoder 200 using the quantization parameter (Qp) and the quantization matrix. By this means, the inverse quantizer 211 restores the orthogonal transform coefficient of the decoding target block and outputs the restored orthogonal transform coefficient to the inverse transformer 212.

The inverse transformer 212 performs the inverse orthogonal transform process corresponding to the orthogonal transform process performed by the transformer 121 of the image encoding device 1. The inverse transformer 212 restores prediction residuals by performing the inverse orthogonal transform process on the orthogonal transform coefficients outputted from the inverse quantizer 211, and outputs the restored prediction residuals (restoration prediction residuals) to the combiner 220.

The combiner 220 reconstructs (decodes) the original block by combining a prediction residual output by the inverse transformer 212 and a predicted block output by the predictor 240 pixel by pixel, and outputs the decoded image on each of blocks to the memory 230.

The memory 230 stores the decoded image outputted from the combiner 220. The memory 230 stores decoded images in units of frames. The memory 230 outputs the decoded images in units of frames to an outside of the image decoding device 2. Note that a loop filter may be provided between the combiner 220 and the memory 230.

The predictor 240 performs prediction in block unit. The predictor 240 includes an inter predictor 241, an intra predictor 242 and a switch 243.

The inter predictor 241 predicts the decoding target block through inter prediction using the decoded image stored in the memory 230 as a reference image. The inter predictor 241 generates an inter prediction block by performing inter prediction in accordance with the index, the motion vector, or the like, output from the entropy decoder 200 and outputs the generated inter prediction block to the switch 243.

The intra predictor 242 predicts the decoding target block through intra prediction based on the index output from the entropy decoder 200 with reference to the decoded image stored in the memory 230. By this means, the intra predictor 242 generates an intra prediction block and outputs the generated intra prediction block to the switch 243.

Specifically, the intra predictor 172 performs intra prediction for the luminance block and outputs a luminance intra prediction block. Further, the intra predictor 172 performs intra prediction for the chrominance block and outputs a chrominance intra prediction block.

The intra predictor 172 performs intra prediction of the luminance block corresponding to the chrominance block before performing intra prediction of the chrominance block. Then, the intra predictor 172 causes the intra prediction mode used in intra prediction of each luminance block to be stored in the memory 230.

The switch 243 switches the prediction block between the inter prediction block input from the inter predictor 241 and the intra prediction block input from the intra predictor 242 and outputs one of the prediction blocks to the combiner 220.

Figure 6:
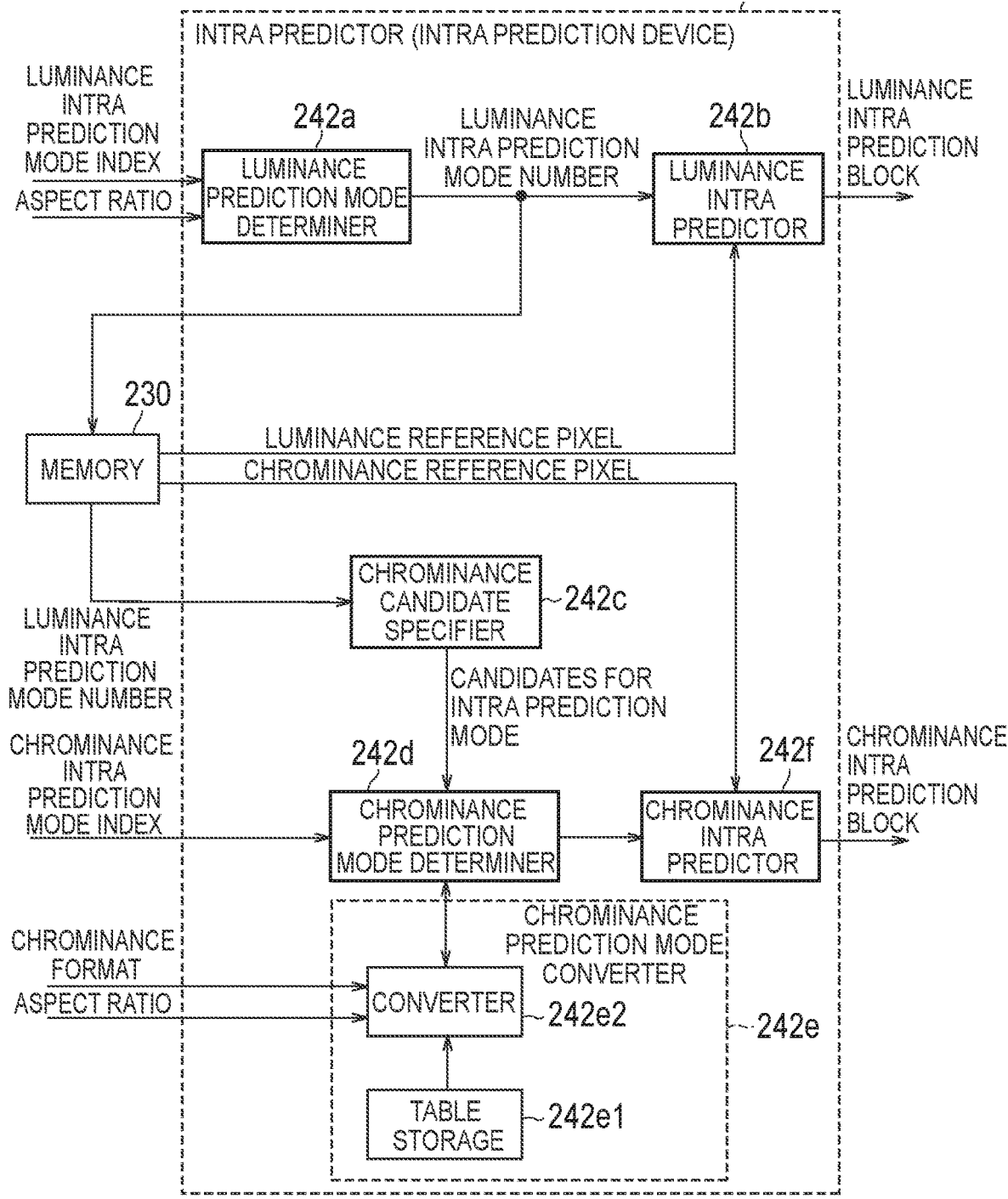
FIG. 6 is a diagram illustrating the configuration of an intra predictor (an intra prediction device) according to the embodiment.

FIG. 6 is a diagram illustrating a configuration of the intra predictor 242 according to the present embodiment. The intra predictor 242 corresponds to an intra prediction device provided at the image decoding device 2.

As illustrated in FIG. 6, the intra predictor 242 includes a luminance prediction mode determiner 242a, a luminance intra predictor 242b, a chrominance candidate specifier 242c, a chrominance prediction mode determiner 242d, a chrominance prediction mode converter 242e and a chrominance intra predictor 242f.

The luminance prediction mode determiner 242a determines an intra prediction mode to be applied to the luminance block based on the luminance intra prediction mode index and the aspect ratio of the luminance block output from the entropy decoder 200 and outputs a mode number of the determined intra prediction mode to the luminance intra predictor 242b and the memory 230. Specifically, the luminance prediction mode determiner 242a replaces the intra prediction mode indicated by the luminance intra prediction mode index with a wide-angle intra prediction mode in accordance with the aspect ratio for the non-square luminance block.

The luminance intra predictor 242b performs intra prediction of the luminance block with reference to decoded luminance reference pixels adjacent to the luminance block using the intra prediction mode indicated by the mode number output from the luminance prediction mode determiner 242a. By this means, the luminance intra predictor 242b outputs the luminance intra prediction block.

As illustrated in Table 2, the chrominance candidate specifier 242c generates a plurality of candidates for the intra prediction mode that can be applied to the chrominance block based on the mode number of the intra prediction mode applied to the luminance block and a plurality of prediction modes (a plurality of default modes) defined in advance and outputs the generated candidates for the intra prediction mode to the chrominance prediction mode determiner 242d. For example, in a case where the mode number of the intra prediction mode applied to the luminance block is "0" (Planar prediction), the chrominance candidate specifier 242c outputs "66", "50", "18", "1" and "0" to the chrominance prediction mode determiner 242d as mode numbers constituting candidates for the intra prediction mode.

Here, the chrominance candidate specifier 242c specifies the mode number of the intra prediction mode applied to the luminance block corresponding to the chrominance block as the DM as one of the candidates for the intra prediction mode to be applied to the chrominance block. The DM corresponds to "X" illustrated in Table 2.

The chrominance prediction mode determiner 242d determines an intra prediction mode to be applied to the chrominance block from a plurality of candidates for the intra prediction mode based on the chrominance intra prediction mode index output from the entropy decoder 200, and the plurality of candidates for the intra prediction mode output from the chrominance candidate specifier 242c and outputs the mode number of the determined intra prediction mode to the chrominance intra predictor 242f.

As illustrated in Table 2, in a case where the intra prediction mode applied to the luminance block is not the default mode and the chrominance intra prediction mode index is "4", the chrominance prediction mode determiner 242d determines the DM (that is, the intra prediction mode applied to the luminance block) as the intra prediction mode to be applied to the chrominance block.

In a case of a chrominance format in which horizontal direction resolution of the chrominance signal is lower than horizontal direction resolution of the luminance signal, specifically, in a case where the chrominance format is 4:2:2, the chrominance prediction mode converter 242e performs DM conversion processing. Specifically, the chrominance prediction mode converter 242e converts the DM specified by the chrominance candidate specifier 242c using a conversion table in which mode numbers before conversion are associated with mode numbers after conversion.

The chrominance prediction mode converter 242e may perform DM conversion using the conversion table before the chrominance prediction mode determiner 242d determines the intra prediction mode. The chrominance prediction mode converter 242e may perform DM conversion using the conversion table only in a case where the chrominance prediction mode determiner 242d determines the DM as the intra prediction mode. Note that the chrominance prediction mode converter 242e may perform conversion of the mode number "66" using the conversion table also in a case where the chrominance prediction mode determiner 242d determines the mode number "66" as the intra prediction mode.

The chrominance prediction mode converter 242e includes a table storage 242e1 and a converter 242e2. In the present embodiment, the table storage 242e1 stores a plurality of conversion tables prepared for each aspect ratio as the conversion table. The converter 242e2 acquires a conversion table corresponding to the aspect ratio of the luminance block corresponding to the chrominance block from the table storage 242e1, converts the DM using the acquired conversion table and outputs a mode number of the DM after conversion.

The conversion table is configured in consideration of WAIP. Specifically, in the conversion table, a given number of mode numbers in ascending order of the mode number among the mode numbers before conversion are associated with a given number of mode numbers in descending order of the mode number among the mode numbers after conversion for directional prediction.

First, a conversion table to be used in a case where the aspect ratio (W:H) of the luminance block corresponding to the chrominance block is 1:1 and 2:1 is illustrated in Table 3. Note that "W" indicates a block width indicated by the number of pixels, and "H" indicates a block height indicated by the number of pixels.

TABLE 3

| Before conversion | X ≤ 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| After conversion | X | 61 | 62 | 63 | 64 | 65 | 66 | 2 | 3 | 4 | 6 | 8 | 10 | 12 | 13 | 14 |
| Before conversion | 17 | 18 | 19 | 20 | 21 | 22 | 23 | 24 | 25 | 26 | 27 | 28 | 29 | 30 | 31 | 32 | 33 |
| After conversion | 16 | 18 | 20 | 22 | 23 | 24 | 26 | 28 | 30 | 32 | 33 | 34 | 35 | 36 | 37 | 38 | 39 |
| Before conversion | 34 | 35 | 36 | 37 | 38 | 39 | 40 | 41 | 42 | 43 | 44 | 45 | 46 | 47 | 48 | 49 | 50 |
| After conversion | 49 | 41 | 42 | 43 | 44 | 44 | 44 | 45 | 46 | 46 | 46 | 47 | 48 | 48 | 48 | 49 | 50 |
| Before conversion | 51 | 52 | 53 | 54 | 55 | 56 | 57 | 58 | 59 | 60 | 61 | 62 | 63 | 64 | 65 | 66 | |
| After conversion | 51 | 52 | 52 | 52 | 53 | 54 | 54 | 54 | 55 | 56 | 56 | 56 | 57 | 58 | 59 | 60 | |

Figure 7A:
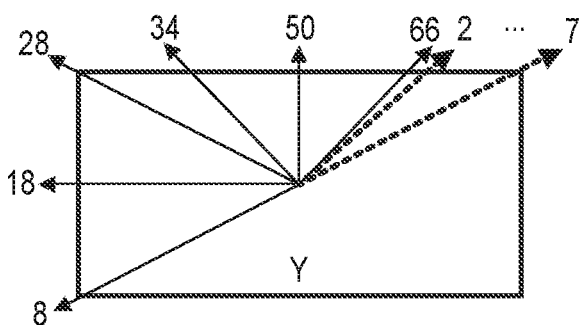
FIG. 7A and FIG. 7B are diagrams illustrating relationship between a luminance block (Y) and a chrominance block (C) in a case where an aspect ratio (W:H) of the luminance block is 2:1.
Figure 7B:
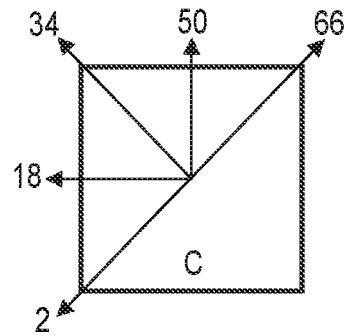

FIG. 7A and FIG. 7B are diagrams illustrating relationship between the luminance block (Y) and the chrominance block (C) in a case where the aspect ratio (W:H) of the luminance block is 2:1.

As illustrated in FIG. 7A, in a case where the aspect ratio (W:H) of the luminance block is 2:1, the luminance block has a horizontally long shape, and thus, intra prediction modes having the original mode numbers "2" to "7" are deleted in line with this shape, and intra prediction modes at wider angles than an angle of the mode number "66" are added clockwise. Mode numbers of the added wide-angle intra prediction modes become "2" to "7".

As illustrated in FIG. 7B, in a case where the aspect ratio (W:H) of the luminance block is 2:1, the chrominance block has a square shape, and thus, wide-angle intra prediction modes are not added.

As illustrated in FIG. 7A and FIG. 7B, the mode numbers "2" to "7" of the luminance block correspond to the mode numbers "61" to "66" of the chrominance block. The conversion table illustrated in Table 3 has a configuration based on such correspondence relationship, and mode numbers "2" to "7" before conversion are associated with mode numbers "61" to "66" after conversion.

A conversion table to be used in a case where the aspect ratio (W:H) of the luminance block corresponding to the chrominance block is 4:1 will be illustrated next in Table 4.

TABLE 4

| Before conversion | X ≤ 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| After conversion | X | 61 | 62 | 63 | 64 | 65 | 66 | 2 | 3 | 5 | 7 | 8 | 10 | 12 | 13 | 14 |
| Before conversion | 17 | 18 | 19 | 20 | 21 | 22 | 23 | 24 | 25 | 26 | 27 | 28 | 29 | 30 | 31 | 32 | 33 |
| After conversion | 16 | 18 | 20 | 22 | 23 | 24 | 26 | 28 | 30 | 32 | 33 | 34 | 35 | 36 | 37 | 38 | 39 |
| Before conversion | 34 | 35 | 36 | 37 | 38 | 39 | 40 | 41 | 42 | 43 | 44 | 45 | 46 | 47 | 48 | 49 | 50 |
| After conversion | 49 | 41 | 42 | 43 | 44 | 44 | 44 | 45 | 46 | 46 | 46 | 47 | 48 | 48 | 48 | 49 | 50 |
| Before conversion | 51 | 52 | 53 | 54 | 55 | 56 | 57 | 58 | 59 | 60 | 61 | 62 | 63 | 64 | 65 | 66 |
| After conversion | 51 | 52 | 52 | 52 | 53 | 54 | 54 | 54 | 55 | 56 | 56 | 56 | 57 | 58 | 59 | 60 |

As illustrated in Table 4, while Table 4 is different from Table 3 in that mode numbers "5" and "7" after conversion are associated with mode numbers "10" and "11" before conversion, Table 4 is the same as Table 3 in that mode numbers "2" to "7" before conversion are associated with mode numbers "61" to "66" after conversion.

Figure 8A:
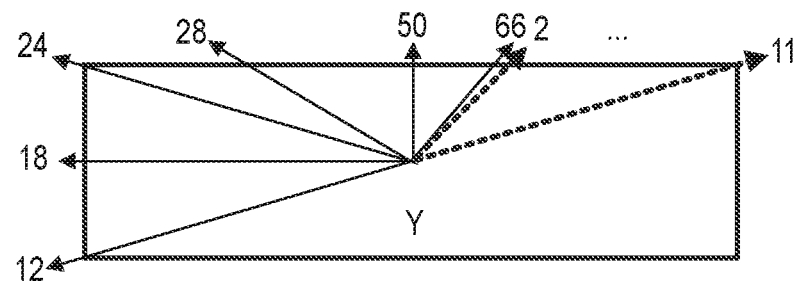
FIG. 8A and FIG. 8B are diagrams illustrating relationship between the luminance block (Y) and the chrominance block (C) in a case where the aspect ratio (W:H) of the luminance block is 4:1.
Figure 8B:
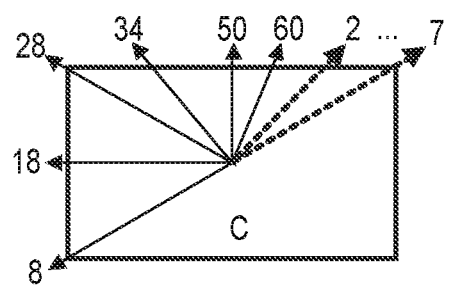

FIG. 8A and FIG. 8B are diagrams illustrating relationship between the luminance block (Y) and the chrominance block (C) in a case where the aspect ratio (W:H) of the luminance block is 4:1.

As illustrated in FIG. 8A, in a case where the aspect ratio (W:H) of the luminance block is 4:1, the luminance block has a horizontally long shape, and thus, intra prediction modes having the original mode numbers "2" to "11" are deleted in line with this shape, and intra prediction modes at wider angles than an angle of the mode number "66" are added clockwise. Mode numbers of the added wide-angle intra prediction modes become "2" to "11".

As illustrated in FIG. 8B, in a case where the aspect ratio (W:H) of the luminance block is 4:1, the aspect ratio (W:H) of the chrominance block becomes 2:1, and thus, intra prediction modes having the original mode numbers "2" to "7" are deleted in line with this shape, and intra prediction modes at wider angles than an angle of the mode number "66" are added clockwise. Mode numbers of the added wide-angle intra prediction modes become "2" to "7".

As illustrated in FIG. 8A and FIG. 8B, the mode numbers "2" to "7" of the luminance block correspond to the mode numbers "61" to "66" of the chrominance block. The conversion table illustrated in Table 4 has a configuration based on such correspondence relationship.

A conversion table to be used in a case where the aspect ratio (W:H) of the luminance block corresponding to the chrominance block is 8:1 is illustrated next in Table 5.

TABLE 5

| Before conversion | X ≤ 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| After conversion | X | 61 | 62 | 63 | 64 | 65 | 66 | 2 | 3 | 5 | 7 | 9 | 11 | 12 | 13 | 14 |
| Before conversion | 17 | 18 | 19 | 20 | 21 | 22 | 23 | 24 | 25 | 26 | 27 | 28 | 29 | 30 | 31 | 32 | 33 |
| After conversion | 16 | 18 | 20 | 22 | 23 | 24 | 26 | 28 | 30 | 32 | 33 | 34 | 35 | 36 | 37 | 38 | 39 |
| Before conversion | 34 | 35 | 36 | 37 | 38 | 39 | 40 | 41 | 42 | 43 | 44 | 45 | 46 | 47 | 48 | 49 | 50 |
| After conversion | 49 | 41 | 42 | 43 | 44 | 44 | 44 | 45 | 46 | 46 | 46 | 47 | 48 | 48 | 48 | 49 | 50 |
| Before conversion | 51 | 52 | 53 | 54 | 55 | 56 | 57 | 58 | 59 | 60 | 61 | 62 | 63 | 64 | 65 | 66 |
| After conversion | 51 | 52 | 52 | 52 | 53 | 54 | 54 | 54 | 55 | 56 | 56 | 56 | 57 | 58 | 59 | 60 |

As illustrated in Table 5, while Table 5 is different from Table 3 in that mode numbers "5", "7", "9" and "11" after conversion are respectively associated with mode numbers "10", "11", "12" and "13" before conversion, Table 5 is the same as Table 3 in that mode numbers "2" to "7" before conversion are associated with mode numbers "61" to "66" after conversion.

Figure 9A:
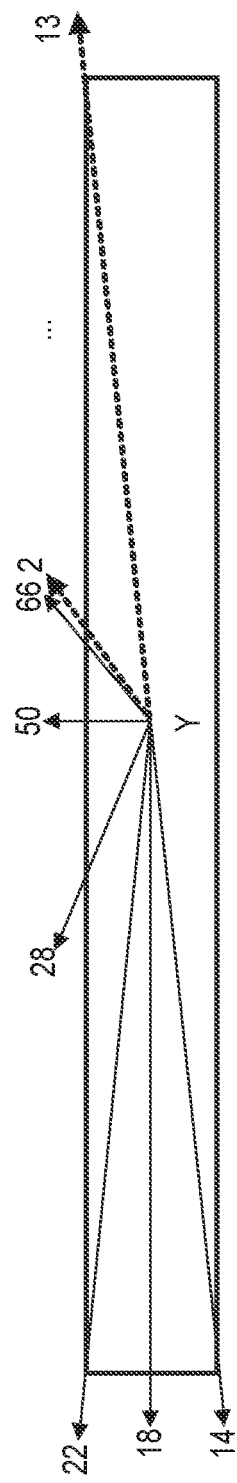
FIG. 9A and FIG. 9B are diagrams illustrating relationship between the luminance block (Y) and the chrominance block (C) in a case where the aspect ratio (W:H) of the luminance block is 8:1.
Figure 9B:
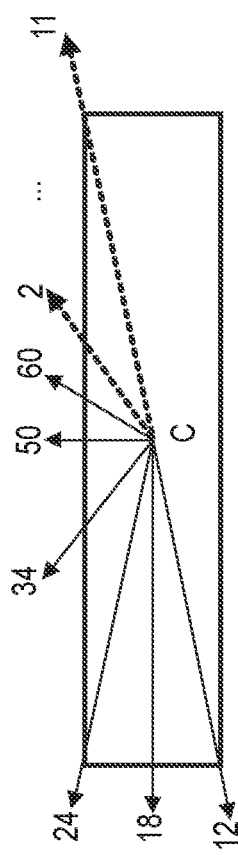

FIG. 9A and FIG. 9B are diagrams illustrating relationship between the luminance block (Y) and the chrominance block (C) in a case where the aspect ratio (W:H) of the luminance block is 8:1.

As illustrated in FIG. 9A, in a case where the aspect ratio (W:H) of the luminance block is 8:1, the luminance block has a horizontally long shape, and thus, intra prediction modes having the original mode numbers "2" to "13" are deleted in line with this shape, and intra prediction modes at wider angles than an angle of the mode number "66" are added clockwise. Mode numbers of the added wide-angle intra prediction modes become "2" to "13".

As illustrated in FIG. 9B, in a case where the aspect ratio (W:H) of the luminance block is 8:1, the aspect ratio (W:H) of the chrominance block becomes 4:1, and thus, intra prediction modes having the original mode numbers "2" to "11" are deleted in line with this shape, and intra prediction modes at wider angles than an angle of the mode number "66" are added clockwise. Mode numbers of the added wide-angle intra prediction modes become "2" to "11".

As illustrated in FIG. 9A and FIG. 9B, the mode numbers "2" to "7" of the luminance block correspond to the mode numbers "61" to "66" of the chrominance block. The conversion table illustrated in Table 5 has a configuration based on such correspondence relationship.

A conversion table to be used in a case where the aspect ratio (W:H) of the luminance block corresponding to the chrominance block is 1:2 will be illustrated next in Table 6.

of the chrominance block becomes 1:4, and thus, intra prediction modes having the original mode numbers "57" to "66" are deleted in line with this shape, and intra prediction modes at wider angles than an angle of the mode number "2" are added counterclockwise. Mode numbers of the added wide-angle intra prediction modes become "57" to "66".

TABLE 6

| Before conversion | X ≤ 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| After conversion | X | 61 | 62 | 63 | 64 | 65 | 66 | 2 | 3 | 4 | 6 | 8 | 10 | 12 | 13 | 14 |
| Before conversion | 17 | 18 | 19 | 20 | 21 | 22 | 23 | 24 | 25 | 26 | 27 | 28 | 29 | 30 | 31 | 32 | 33 |
| After conversion | 16 | 18 | 20 | 22 | 23 | 24 | 26 | 28 | 30 | 32 | 33 | 34 | 35 | 36 | 37 | 38 | 39 |
| Before conversion | 34 | 35 | 36 | 37 | 38 | 39 | 40 | 41 | 42 | 43 | 44 | 45 | 46 | 47 | 48 | 49 | 50 |
| After conversion | 49 | 41 | 42 | 43 | 44 | 44 | 44 | 45 | 46 | 46 | 46 | 47 | 48 | 48 | 48 | 49 | 50 |
| Before conversion | 51 | 52 | 53 | 54 | 55 | 56 | 57 | 58 | 59 | 60 | 61 | 62 | 63 | 64 | 65 | 66 |
| After conversion | 51 | 52 | 52 | 52 | 53 | 54 | 54 | 54 | 55 | 56 | 57 | 57 | 57 | 58 | 59 | 60 |

As illustrated in Table 6, while Table 6 is different from Table 3 in that mode numbers "57" and "57" after conversion are respectively associated with mode numbers "61" and "62" before conversion, Table 6 is the same as Table 3 in that mode numbers "2" to "7" before conversion are associated with mode numbers "61" to "66" after conversion.

Figure 10A:
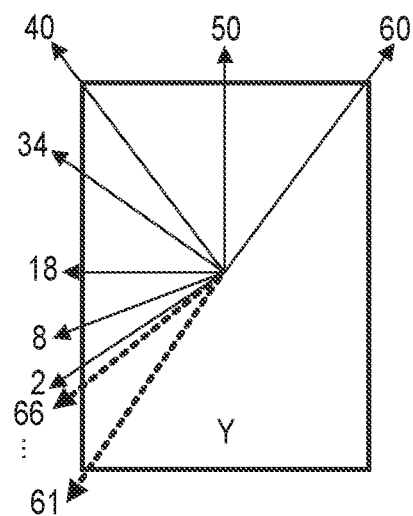
FIG. 10A and FIG. 10B are diagrams illustrating relationship between the luminance block (Y) and the chrominance block (C) in a case where the aspect ratio (W:H) of the luminance block is 1:2.
Figure 10B:
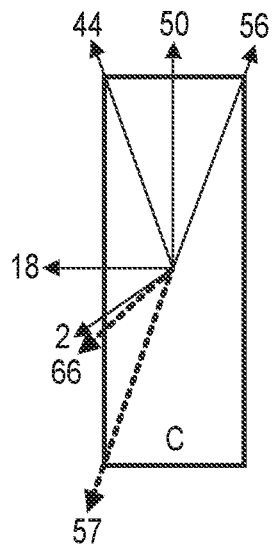

FIG. 10A and FIG. 10B are diagrams illustrating relationship between the luminance block (Y) and the chrominance block (C) in a case where the aspect ratio (W:H) of the luminance block is 1:2.

As illustrated in FIG. 10A and FIG. 10B, mode numbers "2" to "7" of the luminance block correspond to mode numbers "61" to "66" of the chrominance block. The conversion table illustrated in Table 6 has a configuration based on such correspondence relationship.

A conversion table to be used in a case where the aspect ratio (W:H) of the luminance block corresponding to the chrominance block is 1:4 and 1:8 will be illustrated next in Table 7.

TABLE 7

| Before conversion | X ≤ 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| After conversion | X | 61 | 62 | 63 | 64 | 65 | 66 | 2 | 3 | 4 | 6 | 8 | 10 | 12 | 13 | 14 |
| Before conversion | 17 | 18 | 19 | 20 | 21 | 22 | 23 | 24 | 25 | 26 | 27 | 28 | 29 | 30 | 31 | 32 | 33 |
| After conversion | 16 | 18 | 20 | 22 | 23 | 24 | 26 | 28 | 30 | 32 | 33 | 34 | 35 | 36 | 37 | 38 | 39 |
| Before conversion | 34 | 35 | 36 | 37 | 38 | 39 | 40 | 41 | 42 | 43 | 44 | 45 | 46 | 47 | 48 | 49 | 50 |
| After conversion | 49 | 41 | 42 | 43 | 44 | 44 | 44 | 45 | 46 | 46 | 46 | 47 | 48 | 48 | 48 | 49 | 50 |
| Before conversion | 51 | 52 | 53 | 54 | 55 | 56 | 57 | 58 | 59 | 60 | 61 | 62 | 63 | 64 | 65 | 66 |
| After conversion | 51 | 52 | 52 | 52 | 53 | 54 | 55 | 55 | 55 | 56 | 57 | 57 | 57 | 58 | 59 | 60 |

As illustrated in FIG. 10A, in a case where the aspect ratio (W:H) of the luminance block is 1:2, the luminance block has a vertically long shape, and thus, intra prediction modes having the original mode numbers "61" to "66" are deleted in line with this shape, and intra prediction modes at wider angles than an angle of the mode number "2" are added counterclockwise. Mode numbers of the added wide-angle intra prediction modes become "61" to "66".

As illustrated in FIG. 10B, in a case where the aspect ratio (W:H) of the luminance block is 1:2, the aspect ratio (W:H)

As illustrated in Table 7, while Table 7 is different from Table 3 in that mode numbers "55", "55", "57" and "57" after conversion are respectively associated with mode numbers "57", "58", "61" and "62" before conversion, Table 7 is the same as Table 3 in that mode numbers "2" to "7" before conversion are associated with mode numbers "61" to "66" after conversion.

Figure 11A:
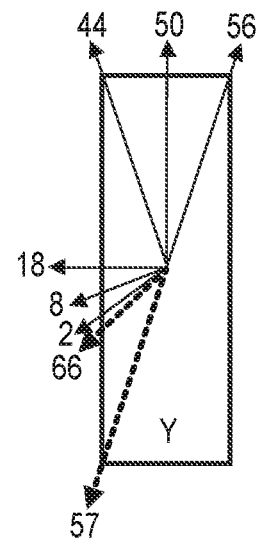
FIG. 11A and FIG. 11B are diagrams illustrating relationship between the luminance block (Y) and the chrominance block (C) in a case where the aspect ratio (W:H) of the luminance block is 1:4.
Figure 11B:
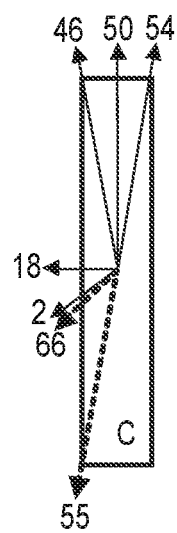

FIG. 11A and FIG. 11B are diagrams illustrating relationship between the luminance block (Y) and the chrominance block (C) in a case where the aspect ratio (W:H) of the luminance block is 1:4.

As illustrated in FIG. 11A, in a case where the aspect ratio (W:H) of the luminance block is 1:4, the luminance block has a vertically long shape, and thus, intra prediction modes having the original mode numbers "57" to "66" are deleted in line with this shape, and intra prediction modes at wider angles than an angle of the mode number "2" are added counterclockwise. Mode numbers of the added wide-angle intra prediction modes become "57" to "66".

As illustrated in FIG. 11B, in a case where the aspect ratio (W:H) of the luminance block is 1:4, the aspect ratio (W:H) of the chrominance block becomes 1:8, and thus, intra prediction modes having the original mode numbers "55" to "66" are deleted in line with this shape, and intra prediction modes at wider angles than an angle of the mode number "2" are added counterclockwise. Mode numbers of the added wide-angle intra prediction modes become "55" to "66".

As illustrated in FIG. 11A and FIG. 11B, mode numbers "2" to "7" of the luminance block correspond to mode numbers "61" to "66" of the chrominance signal. The conversion table illustrated in Table 7 has a configuration based on such correspondence relationship.

Figure 12A:
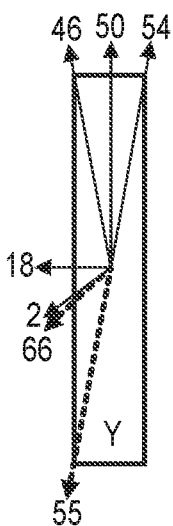
FIG. 12A and FIG. 12B are diagrams illustrating relationship between the luminance block (Y) and the chrominance block (C) in a case where the aspect ratio (W:H) of the luminance block is 1:8.
Figure 12B:
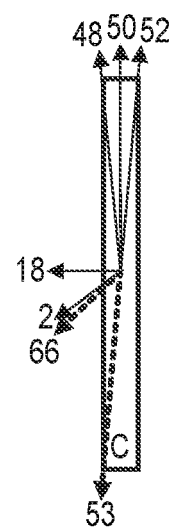

FIG. 12A and FIG. 12B are diagrams illustrating relationship between the luminance block (Y) and the chrominance block (C) in a case where the aspect ratio (W:H) of the luminance block is 1:8.

As illustrated in FIG. 12A, in a case where the aspect ratio (W:H) of the luminance block is 1:8, the luminance block has a vertically long shape, and thus, intra prediction modes having the original mode numbers "55" to "66" are deleted in line with this shape, and intra prediction modes at wider angles than an angle of the mode number "2" are added counterclockwise. Mode numbers of the added wide-angle intra prediction modes become "55" to "66".

As illustrated in FIG. 12B, in a case where the aspect ratio (W:H) of the luminance block is 1:8, the aspect ratio (W:H) of the chrominance block becomes 1:16, and thus, intra prediction modes having the original mode numbers "53" to "66" are deleted in line with this shape, and intra prediction modes at wider angles than an angle of the mode number "2" are added counterclockwise. Mode numbers of the added wide-angle intra prediction modes become "53" to "66".

As illustrated in FIG. 12A and FIG. 12B, mode numbers "2" to "7" of the luminance block correspond to mode numbers "61" to "66" of the chrominance block. The conversion table illustrated in Table 7 has a configuration based on such correspondence relationship.

The chrominance intra predictor 242f outputs a chrominance intra prediction block by performing intra prediction of the chrominance block with reference to decoded chrominance reference pixels adjacent to the chrominance block using the intra prediction mode indicated by the mode number output from the chrominance prediction mode determiner 242d, specifically, the mode number converted by the chrominance prediction mode converter 242e.

In this manner, the conversion tables (Table 3 to Table 7) according to the present embodiment is configured in consideration of wide-angle intra prediction modes of WAIP, that is, prediction directions that deviate from an angle range from −135° to +45°. This enables the DM to be converted into a wide-angle intra prediction mode at an angle greater than −135° in a counterclockwise direction or a wide-angle intra prediction mode at an angle greater than +45° in a clockwise direction, so that the DM can be converted in line with a shape of the chrominance block. It is therefore possible to improve prediction efficiency of the chrominance block.

MODIFIED EXAMPLE

In the above-described embodiment, in a case where the chrominance format is 4:2:2, the chrominance prediction mode converter 242e converts the chrominance intra prediction mode in accordance with the aspect ratio of the luminance block. In such a configuration, a difference between the aspect ratio of the luminance block and the aspect ratio of the chrominance block is strictly taken into account, which leads to increase in accuracy of an intra prediction direction to be applied to the chrominance block and improvement in encoding efficiency.

Meanwhile, in the above-described embodiment, it is necessary to hold a plurality of conversion tables in accordance with the aspect ratio of the luminance block, which increases a memory amount necessary for holding the conversion tables.

Thus, in the present modified example, the chrominance prediction mode converter 242e converts the chrominance intra prediction mode using one conversion table illustrated in Table 8 regardless of the aspect ratio of the luminance block. Specifically, the table storage 242e1 stores one conversion table as the conversion table. The converter 242e2 acquires this conversion table from the table storage 242e1 and converts the DM using the acquired conversion table.

TABLE 8

| Before conversion | X ≤ 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| After conversion | X | 61 | 62 | 63 | 64 | 65 | 66 | 2 | 3 | 4 | 6 | 8 | 10 | 12 | 13 | 14 |
| Before conversion | 17 | 18 | 19 | 20 | 21 | 22 | 23 | 24 | 25 | 26 | 27 | 28 | 29 | 30 | 31 | 32 | 33 |
| After conversion | 16 | 18 | 20 | 22 | 23 | 24 | 26 | 28 | 30 | 32 | 33 | 34 | 35 | 36 | 37 | 38 | 39 |
| Before conversion | 34 | 35 | 36 | 37 | 38 | 39 | 40 | 41 | 42 | 43 | 44 | 45 | 46 | 47 | 48 | 49 | 50 |
| After conversion | 49 | 41 | 42 | 43 | 44 | 44 | 44 | 45 | 46 | 46 | 46 | 47 | 48 | 48 | 48 | 49 | 50 |
| Before conversion | 51 | 52 | 53 | 54 | 55 | 56 | 57 | 58 | 59 | 60 | 61 | 62 | 63 | 64 | 65 | 66 | |
| After conversion | 51 | 52 | 52 | 52 | 53 | 54 | 54 | 54 | 55 | 56 | 56 | 56 | 57 | 58 | 59 | 60 | |

According to the present modified example, it is possible to reduce a memory amount for holding the conversion table while improving accuracy of the intra prediction direction of the chrominance block.

A program may be provided to cause a computer to execute the operations of the image encoding device 1. A program may be provided to cause a computer to execute the operations of the image decoding device 2. The program may be stored in a computer-readable medium. The program can be installed on a computer from a computer-readable medium having the program stored thereon. The computer-readable medium having the program stored thereon may be a non-transitory recording medium. The non-transitory recording medium may include, but is not limited to, a CD-ROM and a DVD-ROM for example.

The image encoding device 1 may be embodied as a semiconductor integrated circuit (chipset, SoC, etc.) by integrating the circuits that execute the respective operations of the image encoding device 1. The image decoding device 2 may be embodied as a semiconductor integrated circuit (chipset, SoC, etc.) by integrating the circuits that execute the respective operations of the image decoding device 2.

The embodiments have been described in detail above with reference to the drawings. Specific configurations are not limited to the above-described configurations, and various design changes, and the like are possible within the scope not deviating from the gist.

The invention claimed is:

1. An intra prediction device that performs intra prediction on a luminance block and a chrominance block obtained by dividing an image formed from a luminance signal and a chrominance signal, the intra prediction device comprising:
   a chrominance candidate specifier configured to specify a mode number of an intra prediction mode applied to the luminance block corresponding to the chrominance block as one of candidates for an intra prediction mode to be applied to the chrominance block; and
   a chrominance prediction mode converter configured to convert the mode number before conversion specified by the chrominance candidate specifier using a conversion table and output a mode number after conversion, in a case where a chrominance format in which horizontal direction resolution of the chrominance signal is lower than horizontal direction resolution of the luminance signal, and vertical direction resolution of the chrominance signal is equal to vertical direction resolution of the luminance signal is applied, wherein
   in the conversion table, a given number of mode numbers in ascending order of a mode number among mode numbers before the conversion are associated with a given number of mode numbers in descending order of a mode number among mode numbers after the conversion for directional prediction.

2. The intra prediction device according to claim 1, wherein the chrominance prediction mode converter comprises:
   a table storage configured to store a plurality of conversion tables prepared for each aspect ratio as the conversion table, and
   a converter configured to acquire a conversion table corresponding to an aspect ratio of the luminance block corresponding to the chrominance block from the table storage and convert the mode number specified by the chrominance candidate specifier using the acquired conversion table.

3. The intra prediction device according to claim 1, wherein the chrominance prediction mode converter comprises:
   a table storage configured to store one conversion table as the conversion table; and
   a converter configured to acquire the one conversion table from the table storage regardless of an aspect ratio of the luminance block corresponding to the chrominance block and convert the mode number specified by the chrominance candidate specifier using the acquired conversion table.

4. An image decoding device including the intra prediction device according to claim 1.

5. A program for causing a computer to function as the intra prediction device according to claim 1.

* * * * *